United States Patent
Carson et al.

(10) Patent No.: US 6,842,668 B2
(45) Date of Patent: Jan. 11, 2005

(54) REMOTELY ACCESSIBLE POWER CONTROLLER FOR BUILDING LIGHTING

(75) Inventors: Steven R. Carson, Allen, TX (US); Raymond T. Griffin, Plano, TX (US)

(73) Assignee: Genlyte Thomas Group LLC, Louisville, KY (US)

( * ) Notice: Subject to any disclaimer, the term of this patent is extended or adjusted under 35 U.S.C. 154(b) by 50 days.

(21) Appl. No.: 10/452,955

(22) Filed: Jun. 3, 2003

(65) Prior Publication Data

US 2003/0197426 A1 Oct. 23, 2003

Related U.S. Application Data (62) Division of application No. 09/947,964, filed on Sep. 6, 2001.

(51) Int. Cl.[7] .......................... G05D 11/00; H04M 11/04
(52) U.S. Cl. .................................. 700/286; 340/310.01
(58) Field of Search .......................... 363/50, 142, 144; 340/310.01, 310.02, 310.03; 700/9, 20, 22, 286, 292, 293, 295, 297, 298; 315/288, 294, 295, 297, 307, 308, 312, 313, 320

(56) References Cited

U.S. PATENT DOCUMENTS

| | | | | |
|---|---|---|---|---|
| 4,749,992 A | * | 6/1988 | Fitzemeyer et al. ... | 340/870.02 |
| 5,572,438 A | * | 11/1996 | Ehlers et al. ................ | 700/295 |
| 5,668,446 A | | 9/1997 | Baker .......................... | 315/294 |
| 6,229,432 B1 | * | 5/2001 | Fridley et al. .......... | 340/310.01 |
| 6,388,396 B1 | | 5/2002 | Katyl et al. .................. | 315/294 |
| 6,388,399 B1 | | 5/2002 | Eckel et al. ................. | 315/312 |
| 6,392,368 B1 | * | 5/2002 | Deller et al. ................. | 315/317 |
| 6,400,103 B1 | | 6/2002 | Adamson ..................... | 315/292 |
| 6,487,457 B1 | | 11/2002 | Hull et al. ..................... | 700/17 |
| 6,507,158 B1 | | 1/2003 | Wang .......................... | 315/294 |
| 6,519,509 B1 | | 2/2003 | Nierlich et al. ............. | 700/286 |
| 6,528,957 B1 | | 3/2003 | Luchaco ..................... | 315/307 |

* cited by examiner

*Primary Examiner*—Matthew V. Nguyen
(74) *Attorney, Agent, or Firm*—Dennis T. Griggs (57) ABSTRACT

A remotely accessible power controller communicates power reduction command signals by power line carrier (PLC) signaling over existing AC power distribution conductors for automatically disconnecting building lighting loads. Turn-off command signals from a local or remote controller automatically disconnect building lighting loads according to a time-of-day schedule to comply with mandated energy consumption codes applicable to the automatic shutoff of electrical lighting. Load shedding (selective turn off and/or dimming) command signals transmitted from public or private utility companies automatically disconnect or reduce building lighting loads in accordance with load curtailment agreements to limit total connected power consumption below an agreed level. The power controller is connected by a minimum amount of retrofit wiring into an existing end-user alternating current power distribution network, for example, a building power distribution network having AC power conductors that service multiple lighting loads interconnected in one or more power phase groups. Each dimming lighting load is equipped with an addressable dimming module for decoding and executing dimming and turn-on and turn-off power reduction commands. Fluorescent lamps are equipped with addressable electronic dimming ballasts.

44 Claims, 4 Drawing Sheets

REMOTELY ACCESSIBLE POWER CONTROLLER FOR BUILDING LIGHTING

BACKGROUND OF THE INVENTION

This invention relates generally to electrical load controllers for saving energy in commercial buildings, and in particular to a remotely accessible power controller for automatically disconnecting building lighting loads to comply with energy consumption codes applicable to the automatic shutoff of electrical lighting, and for automatically disconnecting or dimming building lighting loads to limit total connected power consumption below an agreed level in accordance with load curtailment agreements with public or private utility companies.

In an effort to make more efficient use of available energy resources, government authorities are adopting and mandating building energy codes. In particular, many jurisdictions have adopted the International Energy Conservation Code (IECC) which references ASHRAE/IESNA Standard 90.1 for commercial buildings. Part III (3) of that standard, concerning interior lighting, requires that all commercial buildings more than 5000 square feet in size must be equipped with automatic lighting shutoff in all spaces, by using time of day controls, occupancy sensor controls or other automatic controls that do not require operator intervention, so that energy can be saved during hours when the spaces are not occupied.

Modern building control systems generally allow an operator to control various operating systems from a centralized or remote building control station. For example, the building operator can monitor and exercise control over lighting systems, HVAC (heating, ventilation and air conditioning), water and waste disposal, furnaces, cooling towers, heat exchangers, ventilation dampers, fire detection and alarm systems, security cameras and other building service equipment. Such controls are implemented to maintain a customized set of building services to satisfy the comfort, safety and business needs of building tenants according to leasehold agreements.

The majority of existing commercial buildings are not equipped for automatic light shut off operation, and thus are not presently in compliance with ASHRAE/IESNA Standard 90.1. The retrofit modification of existing building lighting control systems with additional control wiring incurs considerable costs and provides only limited flexibility in configuring an existing lighting control network to accommodate automatic time-of-day disconnect schedules.

Moreover, some building operators may contract for lower rates from a utility company in exchange for voluntarily reducing its overall energy consumption or shedding selected electrical loads at the utility's request. Typically, such curtailment requests are made during peak demand periods (e.g., on a hot summer afternoon), and the building operator would be obligated to shed electrical loads by dimming or turning off lights, adjusting air conditioning thermostats, and terminating the operation of non-essential electrical machinery. In exchange, the utility company will charge the building operator lower overall rates for its energy consumption. Usually, such load shedding is accomplished by hand, turning off lights and non-essential loads room-by-room.

Many lighting installations are not equipped for dimming, so that a curtailment request when implemented means that the work force must be sent home. Consequently, there is a continuing interest in providing load-shedding control with dimming capability in existing lighting installations so that business can continue with reduced illumination while accommodating load-shedding curtailment requests, as well as accommodating automatic time-of-day load disconnect schedules when the work force is not present.

The majority of existing commercial buildings are not equipped for automatic light shutoff or dimming operation, so that considerable retrofit wiring is required. Conventional lighting control systems installed in existing commercial buildings control multiple lighting circuits that may be widely separated from each other by a substantial distance, for example in an office building, a manufacturing facility, in a restaurant, a large meeting hall or in a theater. In those installations that include dimming capability, each light or group of lights may be selectively controlled through a power dimmer, which is in turn connected to an individual controller or operator switch. In such a system, separate sets of wires run from a central controller to each light or group of lights. Sometimes, dimmers are included along with wall-mounted toggle switches for controlling the level of power supplied to each of the lighting circuits. Such dimmers usually take the form of rheostats that are manually set to the desired level of brightness. Consequently, even for small installations, a large amount of wiring is necessary to connect all of the lights with their respective power dimmers, and to connect the power dimmers to their respective controllers.

In commercial building lighting installations, two-phase or three-phase power is supplied, with phase A power being applied to one group of electrical loads, phase B power being applied to another load group and phase C power being applied to another load group. Consequently, in a large area lighting installation, some of the lighting loads will be supplied by phase A power, other lighting loads will be supplied by phase B power and other lighting loads will be supplied by phase C power. Dimming circuits typically utilize semiconductor switching devices whose duty cycle is controlled with reference to the phase of the current waveform. Because of the phase difference, it is difficult to utilize conventional light dimming systems that employ a microprocessor controlled memory unit for selectively controlling the application of power to a specific group of lighting loads, individual ones of which may be separately energized by phase A, phase B power and phase C power.

Consequently, a lighting controller for performing automatic turn off and dimming operations is needed in which the amount of retrofit wiring required for connecting the controller to multiple power dimmers and lighting loads is substantially reduced. Such a lighting control and dimming system desirably should be operable via power line carrier (PLC) signaling over existing AC power conductors by which the ON-OFF and dimming operation of groups of individually-dimming and non-dimming lighting loads can be controlled, without appreciably increasing the amount of wiring. Moreover, in large area lighting, multiple power phase installations, the lighting control and dimming system should be capable of reliable operation in which power disconnect signals and dimming signals from a remote controller or a master controller can be communicated independently of line phase.

Power disconnect and dimming signaling for controlling the AC power applied to lighting loads has been implemented by conventional power line carrier (PLC) communication systems using the existing alternating current (AC) power lines for conducting control signals to addressable electronic control devices, for both dimming and non-dimming lighting loads connected to the power lines. In general, an addressable PLC pulse receiver is connected between the power line and each load that is to be controlled, and at least one PLC encoded command signal pulse transmitter is connected to the power line. By utilizing the existing power conductors as the means for communication between the PLC transmitter and receivers, such control systems can be installed without requiring the installation of additional wiring. Further, utilization of the power conductors also provides a greater physical range of control than could be achieved via infrared, ultrasonic or FM control signaling systems.

Typically, the PLC control signals are communicated at a substantially higher carrier modulation frequency (i.e., frequencies at least two orders of magnitude higher than the power line frequencies), e.g., at 120 kHz to 200 kHz or higher as compared to conventional alternating current power distribution frequencies (e.g. 50/60 Hz or 200/400 Hz). There are substantial high frequency noise and interfering signals such as harmonics of the power signal, switching transients, etc. that interfere with the PLC command signals. Numerous techniques are known for operating in a noisy environment for example, in some cases, the signaling commands are repeated to assure transmission, spread spectrum signals are used in other cases, in addition to many other techniques.

A major limitation on the use of power line carrier communications is spurious signals and background noise including impulse noise. Such noise can originate from the power source, the distribution network, loads coupled to the distribution network and from remote sources. For example, the alternating current power delivered from a public utility is not a pure sine wave. The AC supply current contains harmonics that can interfere with PLC command signals. Additionally noise may be introduced from the loads (including switching transients). By way of illustration, if the load is an active device such as a dimmer and lamp, the dimmer may "chop" the 60 Hz AC power waveform to reduce the lighting intensity. This introduces harmonics and high frequency noise on the power distribution conductors.

This high frequency noise makes it more difficult to communicate reliably over power lines particularly since some of the harmonics and noise associated with the power distribution fall within the frequency range of the PLC command signals. Such noise is not constant with respect to time, it also varies from place to place in the power distribution network. Moreover, a conventional AC power line network is used for power distribution to several electrical load devices. Each of a variety of load devices can conduct a significant level of noise back onto the power line. Different loads and control devices produce different types and degrees of noise that may interfere with the flow of information over the power line.

Another potential limitation on PLC signaling is signal attenuation. Due in part to the diverse impedance levels of the electric loads coupled to a PLC network, digital pulse communication signals may undergo more than 40 dB of attenuation before being captured by a receiver. This significant attenuation in combination with noise interference makes reliable PLC communication very difficult.

The noise and attenuation problems existing in a particular power line network may vary substantially from one network to another depending on the types of devices connected to or coupled in some way to the power line network. Moreover, even the mode of operation of particular load devices on the power line network may differentially affect the noise or attenuation levels throughout the network.

For these reasons, a signaling protocol is preferred for efficiently and accurately transmitting information from a source node to a receiving node on a power line network.

One conventional signaling protocol, "X-10," provides sensing, control and communications over AC power lines. The X-10 system was developed by Pico Electronics of Fife, Scotland and X-10 compatible products are distributed in the United States by X-10 (USA) Inc. of Northvale, N.J. The X-10 system utilizes a signaling means whereby simple control signals (i.e., on, off, dim, brighten, etc.) are transmitted over pre-existing power conductors for remotely controlling power to lighting and other electrical loads. The X-10 power line data communication protocol is disclosed in U.S. Pat. Nos. 4,200,862; 4,628,440; and 4,638,299.

Another protocol for two-way communications links is the Electronic Industries Association Consumer Electronics Bus (CEBus) protocol for radio frequency media, power line carrier, infrared media and twisted pair media. The CEBus protocol provides operating standards for establishing a local area network, or LAN, over five physical distribution media: electrical power conductors (PLBus), twisted pair (TPBus), coaxial cable (CXBus), infrared light (IRBus) and low power wireless radio (RFBus). This standard specifies how devices are to send and receive information, the media available to them for communication purposes and the format for the information the devices communicate to each other. In particular, the CEBus standard permits devices made by various manufacturers to be able to communicate with each other.

In the X-10 system and as well as the CEBus and other encoded protocol systems, for example LonWorks, BACnet and Echelon, the carrier detection threshold level is fixed. In selecting a threshold level for such a system, the level must be relatively high to provide some immunity from expected noise. The reliability of such systems is compromised when the signal-to-noise ratio is low. In particular, this increases system vulnerability to spurious signals and sensitivity to electrical noise, causing lost messages, false interpretation and spurious activation. Different types of electrical noise that can interfere with PLC encoded protocol systems are developed on the AC power line from electrical equipment such as power tools and machines that use induction motors, electronic and magnetic ballasts, personal computers, and pumps. The noise may have even originated from a nearby building that is supplied from the same power distribution transformer. These types of noise disturbances can occur any time during the day, night or on a weekly basis, causing erratic communication including false turn-ON/turn-OFF of PLC—controlled devices.

It is essential that the PLC signal strength be strong over the entire network. Low signal strength means erratic or loss of control on the most distant devices from a PLC transmitting device. Signal strength loss on a circuit can be due to several factors, including the number of interconnected PLC devices, power conductor losses and non-PLC devices on the circuit.

Typically, each control device on the PLC network can reduce the signal strength progressively by as much as 15%–20% per device. For example, if a PLC device transmits a 4V signal strength on its power line then the next (2nd) nearest device on the same power line will load the signal strength down by 20% to 3.2V. The third device would reduce the remaining signal again by 20% to 2.6V, the fourth to 2.08V, the fifth to 1.664V, the sixth to 1.33V, the 7th to 1.065V, the 8th to 0.852V, the 9th to 0.68V, and the 10th device to 0.545V.

Power wiring losses must also be taken into account. Wiring loss is due to the power wiring resistance and capacitance losses that reduce signal strength. The greater the distance between a PLC device to another PLC device the more loss of signal strength occurs. The wiring has very little effect on signal strength if the PLC devices are in the same multi-ganged wall box or wiring distance is very short. However, for each 50 feet length of 12 AWG Romex from one PLC device to another a loss of about 18% of the signal strength should be expected.

For example, if a 150 ft. length of 12 AWG Romex is connected between two PLC devices and one device sends a 4.0 V signal strength command to the other unit, a signal strength of 1.77 V would be expected after losses: after the first 50 ft. of wire length, the signal strength would drop by 18% to 3.28 V, the next 50 ft. (100 ft. total) distance the signal strength would drop another 18% to 2.69 V, the last 50 ft. (150 ft. total) of distance signal strength would drop another 18% to 2.21 V. When the PLC receiving device loss of 20% included, the signal strength remaining would only be 1.12 V.

Other PLC devices or non-PLC devices on the PLC network that can degrade the signal strength include: passive PLC couplers (used to connect phases together), and non-PLC devices such as personal computers, laser printers and power surge suppressors. When the losses are calculated and the other factors mentioned are added in then it is easy to understand why the PLC signals may be too weak to activate a receiver. Some suppliers of PLC devices require a minimum of 50–100 mV signal strength for reliable data capture operation. Preferably, a minimum of 500 mV of signal strength should be available at any signal receiving node on the network.

Many vendors recommend using a passive coupler to couple PLC signals between phases. These couplers will further reduce the signal strength. Sometimes a repeater amplifier will be used to jump phases and amplify the signal strength. These do not solve the problem of other circuits that are on the same phase that might need to be amplified.

In a network system the PLC signal must cross phases if some PLC devices are on one phase and some PLC devices are on the other. If a passive filter (non-amplifying device) is used, a loss of about 20% of the signal strength can be expected on the other phase. These signal bridges are normally hardwired at the distribution panel. Since the distribution panel will normally be several feet from the PLC devices the wiring loses will further reduce the PLC signal strength. These loses usually cause a critical reduction of signal strength on the other phases to allow reliable communication across the PLC network.

BRIEF SUMMARY OF THE INVENTION

The present invention provides a remotely accessible power controller that uses power line carrier (PLC) signaling over existing AC power distribution conductors for automatically disconnecting or reducing building lighting loads. Turn-off command signals from a local or remote controller automatically disconnect building lighting loads according to a time-of-day schedule to comply with energy consumption codes applicable to the automatic shutoff of electrical lighting. Load shedding (selective turn off and/or dimming) command signals transmitted from public or private utility companies, for example a utility provider, automatically disconnect or reduce building lighting loads in accordance with load curtailment agreements to limit total connected power consumption below an agreed level. The power controller is connected by minimum amount of retrofit wiring into an existing end-user alternating current power distribution network, for example, a business power distribution network having AC power conductors that service multiple lighting loads interconnected in two or more power phase groups. Load disconnect commands and load reduction (dimming) commands are transmitted on the AC power conductors in power line carrier format to addressable PLC receivers connected to the dimming and non-dimming lighting loads.

Interference from external noise sources is prevented by using an in-line high frequency blocking filter and a command signal transmitter for each communication channel. The high frequency blocking function is realized by a low pass filter circuit characterized by a relatively low attenuation signal transfer function from DC through the power distribution frequency up to a cut-off frequency below the power line carrier modulation frequency, and characterized by a relatively high attenuation signal transfer function that suppresses or substantially attenuates all other signals above the cut-off frequency. This filter function essentially allows the PLC power controller to dominate the lighting branch circuits by blocking the transmission of all noise sources and unwanted foreign command signals originating externally to the PLC network, and blocking the reverse transmission of high frequency noise originating internally from active branch loads and local command signals applied to the branch conductors. The power controller generally improves the reliability of power line carrier communications in an end user alternating current power distribution network, for example, in a commercial building power distribution network having existing power distribution conductors that service multiple, diverse loads such as halogen incandescent lamps with a switched step-down power supply, standard incandescent lamps with a high frequency dimmer and fluorescent lamps with an electronic ballast dimmer.

Each communication channel is isolated from external noise and spurious signal sources by an in-line high frequency blocking filter in combination with a command signal transmitter that boosts the signal strength, for example to 7.0 V peak-to-peak, not only when the network signals cross phases but also between each branch circuit on the network. At least 500 mV or higher signal strength is recommended even though signal routing (firewall protection) requires only 35 mV or less signal strength for reliable operation. The higher level is recommended to accommodate any other equipment or power surges that might weaken the signal. This coupled with the in-line high frequency blocking filter on each channel virtually eliminates any interference from spurious signal sources and electrical noise and compensates for additional loading caused by noise generated on other lines that degrade the signal strength, for example from computers, laser printers, surge-protection devices, induction motors and the like.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken with reference to the attached drawing figures in which.

DETAILED DESCRIPTION OF THE INVENTION

A preferred embodiment of the invention will now be described with reference to various examples of how the invention can best be made and used. Like reference numerals are used throughout the description and several views of the drawing to indicate like or corresponding parts.

Figure 1:
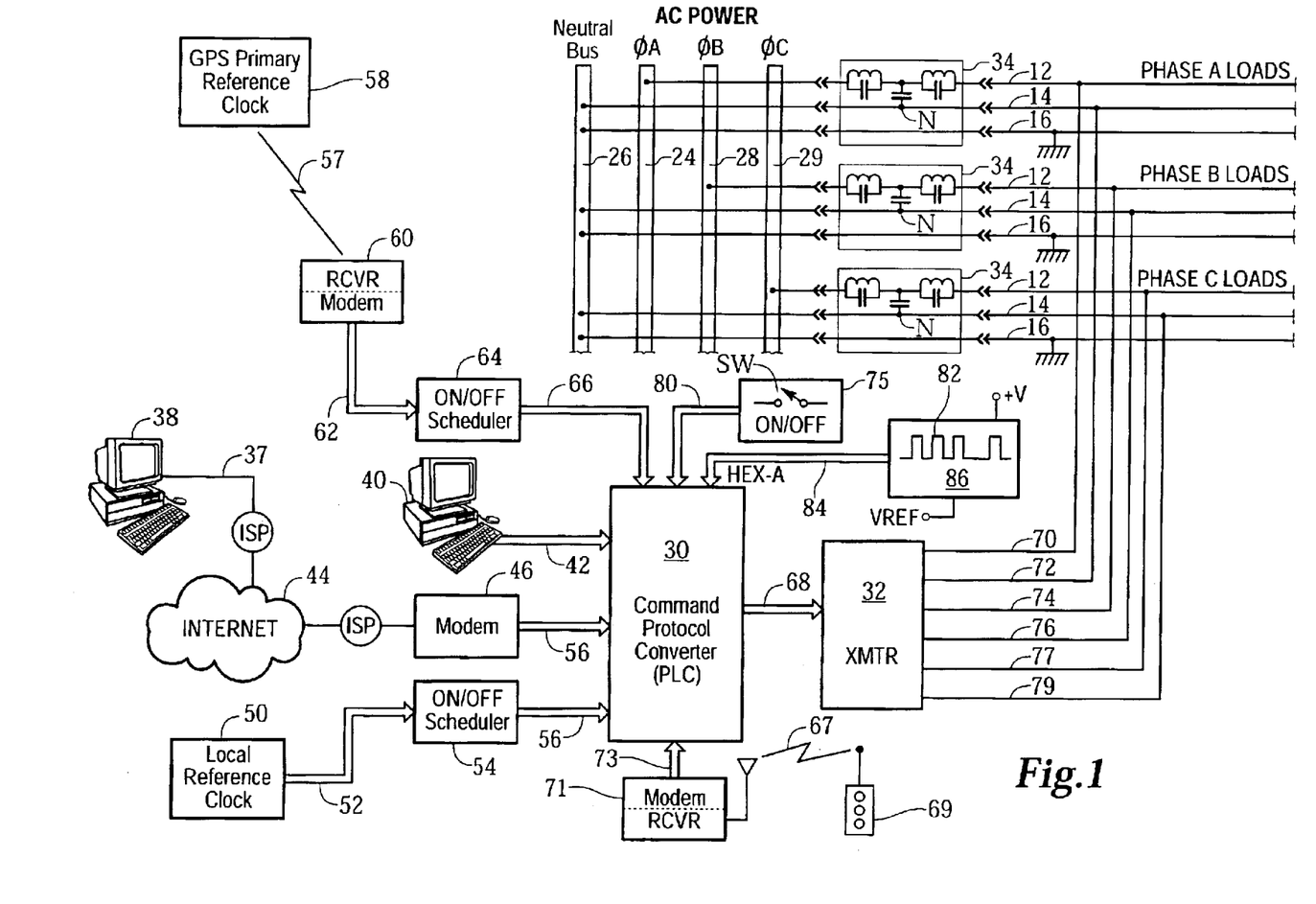
FIG. 1 is a block diagram showing a power line carrier (PLC) network power controller for a three-phase lighting control system in which load reduction command signals are received from on-site and remote command control centers.
Figure 2:
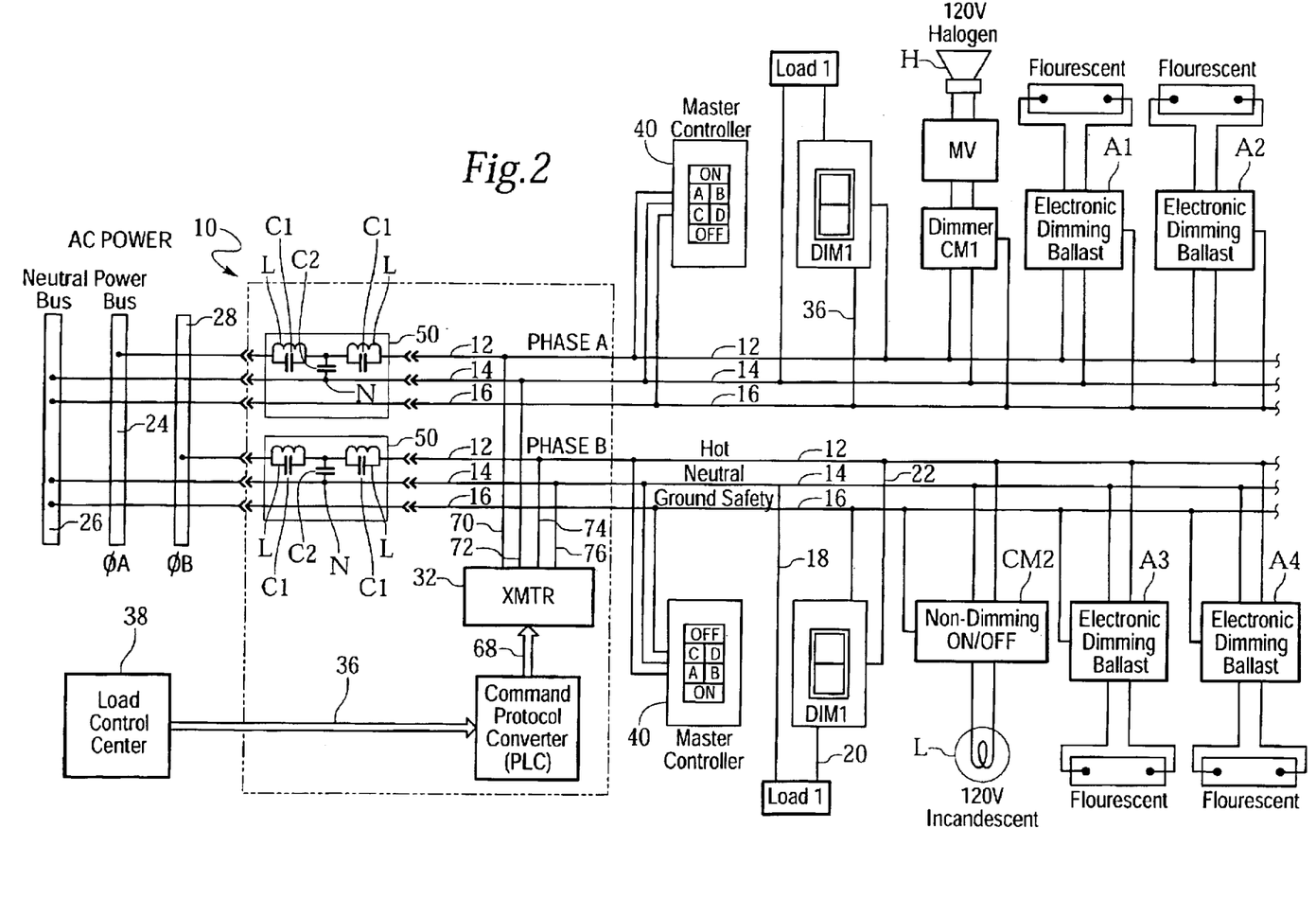
FIG. 2 is a block diagram showing a power line carrier (PLC) network power controller for a two-phase lighting control system in which load reduction command signals from on-site and remote command control centers control dimming and non-dimming lighting loads.
Figure 3:
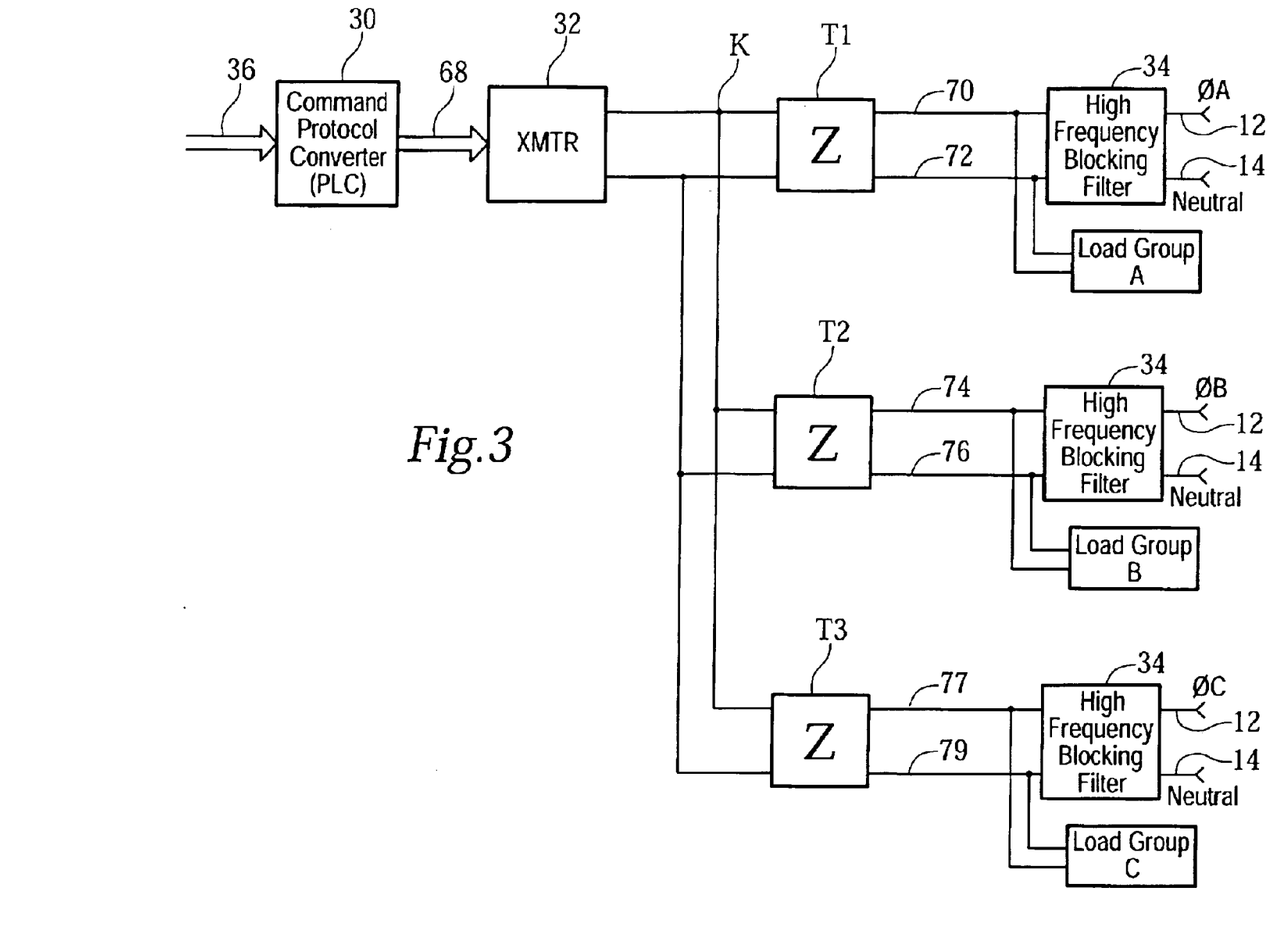
FIG. 3 is a block diagram showing the high frequency blocking filter and command signal transmitter of the present invention controlling three-phase AC power supplied to lighting loads of three independent load groups.

Referring now to FIG. 1 and FIG. 2, the power controller circuit 10 of the present invention will be described with reference to a typical AC power distribution system commonly used for 110 volts, 60 Hz AC power service, in which AC power is conducted via hot, neutral and ground safety power line conductors 12, 14 and 16, respectively in either three phases A, B and C (FIG. 1), or two phases A and B, (FIG. 2). The power lines of most electrical power distribution systems conduct alternating current (AC) at a selected operating voltage (e.g., 110 VAC, 120 VAC or 220 VAC) and power distribution frequency (usually 60 Hz in the U.S. and 50 Hz elsewhere) via one or more phases (e.g., single-phase, two-phase or three-phase service) supplied by a private or public utility company. The AC power is applied to multiple lighting loads, both dimming and non-dimming as shown in FIG. 2, that may be connected in separate load groups A, B and C located, for example, in an office building that is subject to a mandatory building energy code, for example the International Energy Conservation Code (IECC) which references ASHRAE/IESNA Standard 90.1.

The power line conductors are insulated aluminum or copper wire conductors, typically 12 AWG Romex copper. Line 12, commonly known as the "hot" line, may be a black color-coded wire and line 14, referred to as the "neutral" line, may be a white color-coded wire. The neutral line is connected to earth ground by the ground safety conductor 16. For each phase, AC power is then distributed over lines 12 and 14 with the neutral line 16 providing a ground at each load. Generally, a main circuit breaker is used for each phase in addition to branch circuit breakers in each power distribution branch. In some cases a separate ground wire is not used to provide a ground connection. Instead, a ground return path is obtained from a metallic conduit, water pipe or the like.

According to conventional AC wiring practice, one terminal of a lighting load, for example LOAD 1, is connected to the neutral supply conductor 14 by a load conductor 18, and the other terminal of LOAD 1 is connected to the switched terminal of a signaling device, for example a dimmer switch DIM 1 by a load conductor 20. Operating power is supplied to the dimmer switch through a conductor 22 that is connected to the hot supply conductor 12. Preferably, the dimmer switch DIM 1 is an addressable dimmer that includes a pulse receiver control module for decoding PLC encoded digital data control signals conducted over the power distribution conductors for controlling the AC power applied to the dimming load (Load 1), which may be an incandescent lamp, for example.

The lighting control modules used in the preferred embodiment of this invention may be an integrated unit wherein the lamp, electrical connections the control circuitry and other electronics that are necessary for programming, selection, and receipt of PLC command transmissions from the power controller 10 are integrally provided. The lamp control module may be a dimming unit with On/Off operation, for example lamp control module CM1 that controls the voltage applied to a low voltage stepdown multivibrator power supply MV of a halogen lamp H, or it may be one with ON/OFF operation only, with no dimming function being provided, for example the lamp control module CM2 that connects and disconnects an incandescent lamp L.

As used herein, a "control module" means and refers to any one of several load control devices that include a signal receiver for decoding or recovering control data signals from a modulated carrier signal on an AC power conductor, as well as signal receiver/transmitter (R/T) units that have the ability to receive and decode, demodulate or otherwise recover digital data control signals from a modulated carrier signal, and to encode and transmit digital control signals.

Operating power is conducted through a thermal circuit breaker that connects the hot conductor 12 to the phase A power bus 24. Load current is returned through the neutral conductor 14 to a neutral bus 26. According to conventional wiring practice, the ground safety conductor 16 is also electrically connected to the AC neutral bus and is extended in parallel with the hot conductor 12 along the distribution path for safety purposes. Phase B of the AC operating voltage is supplied to a second group of lighting loads on an independent power distribution circuit in which the hot conductor 12 is connected to the phase B power distribution bus 28. Likewise, phase C of the AC operating voltage is supplied to a third group of lighting loads on an independent power distribution circuit in which the hot conductor 12 is connected to the phase C power distribution bus 29.

The power controller 10 includes a command protocol converter 30, a command signal transmitter 32 and a high frequency blocking filter 34 interconnected into each phase of the existing two-phase or three-phase AC power distribution system of a commercial building. Turn-off and load reduction commands are received from an on-site building operations center or from a remote load control center, for example a private or public utility company.

Referring again to FIG. 1 and FIG. 2, the high frequency blocking filter 34 has input terminals connected to an AC power source and output terminals connected in series with the power distribution conductors 12, 14. The high frequency blocking filter 34 provides a high-frequency attenuation ratio of 40:1, thus isolating the PLC power control network and its connected components from external noise and spurious high frequency signals. Preferably, the high frequency blocking filter 34 is realized by a symmetrical, T-section low pass filter circuit that has very low attenuation from DC up through the power distribution frequency (50 Hz–60 Hz) to a cut-off frequency (e.g., 80 kHz), and "blocks" or substantially attenuates all other signals above the cutoff frequency. All components connected to the filtered side of the power distribution conductors are isolated from external noise and spurious signals from external devices on other phases or other channels. The filter 34 also blocks high frequency signals produced by active circuits coupled to the load side of the filter, thus suppressing high frequency noise as well as blocking high frequency PLC signaling from its output to its input.

Figure 4:
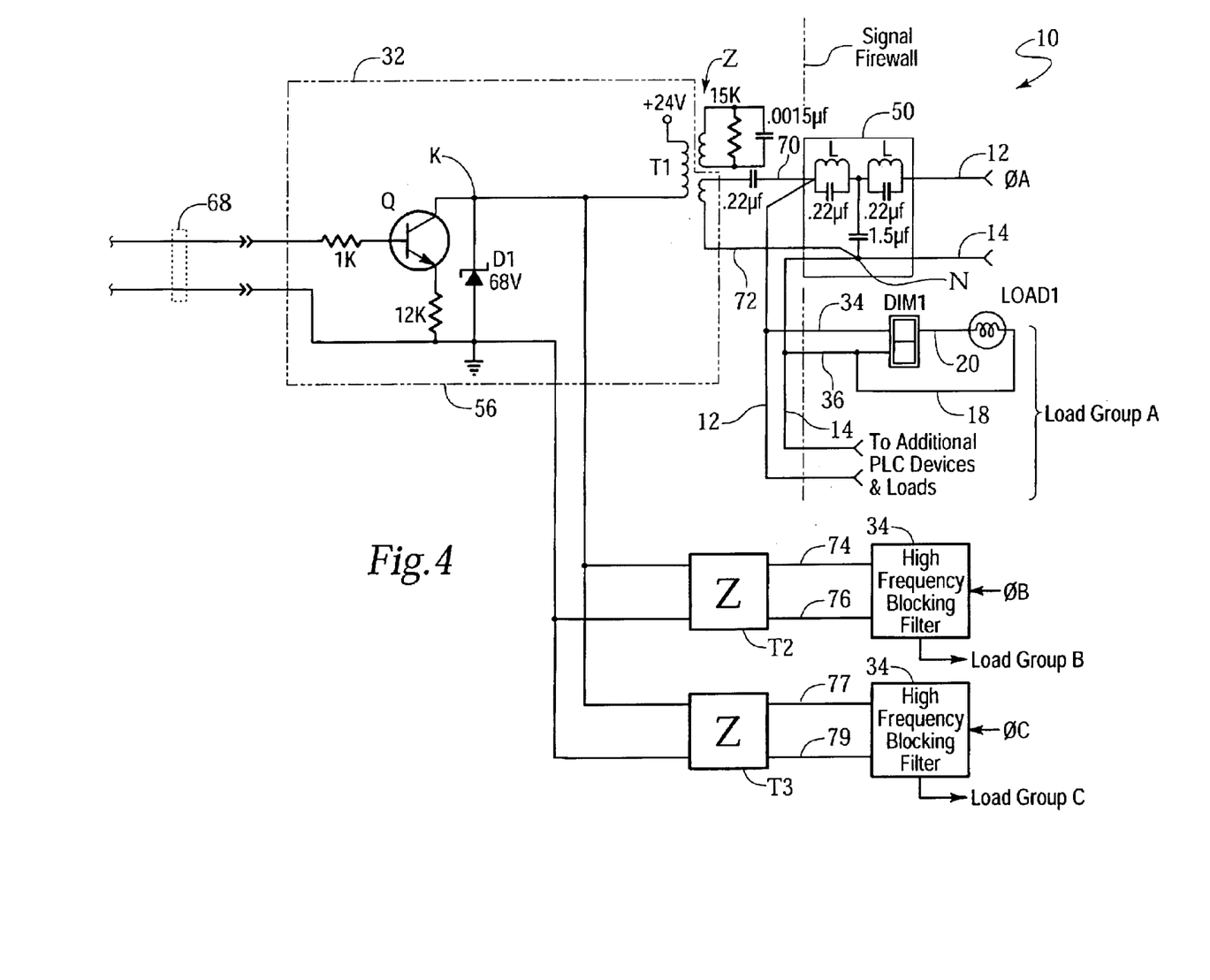
FIG. 4 is a circuit diagram showing circuit details for the command signal transmitter and high frequency blocking filter of the present invention.

Referring now to FIG. 4, each section of the symmetrical low pass, high frequency blocking filter circuit 34 preferably includes an inductor L and capacitors C1, C2 connected in a parallel resonant circuit that is tuned to present maximum impedance to signals at power line carrier modulation frequencies in the kilohertz region (e.g., 80–160 kHz), but present minimum impedance to signals at AC power distribution frequencies in the 50 Hz/60 Hz range with very little attenuation or loss. For operation at 60 Hz AC power distribution and 120 kHz PLC carrier modulation, the preferred capacitor values for C1 is 0.22 uF, for C2 is 1.5 uF and the preferred inductance value L is 9.4 uH for each section. This allows the 60 Hz AC supply power to pass with very low attenuation, thus delivering clean, filtered AC current and voltage at 60 Hz on the power distribution conductors 12, 14 that supply operating power to the dimming and non-dimming lighting loads.

For lowest noise threshold operation, the neutral node N of each blocking filter 34 includes an independent neutral connection to the neutral bus 26. However, the neutral nodes N of all three blocking filters could be connected in common and connected to the neutral bus by a single conductor. Although the common node connection arrangement increases the noise threshold slightly, it reduces the amount of retrofit wiring and labor required for installation, and thus can be used successfully for low cost installations where the slightly increased noise level is does not interfere with PLC signaling.

The command protocol converter 30 receives power control command data signals 36 from a remote load control center 38. The command data signals may be processed in various conventional formats, for example ASCII command protocol, and protocols established by national trade organizations such as the Electronic Industries Alliance (ELA), for example EIA Standard data protocols RS232, RS422, RS423 and RS485, as well as Ethernet and HEX-encoded, analog data pulses applied as serial data command words. The load command data signal can originate from various on-site and off-site command centers, as shown in FIG. 1. For example the load reduction command signals may originate from an on-site desktop computer 40, and the command signals are output in RS232 signal format on a single-ended serial data cable 42. In another arrangement, load reduction commands 37 are originated from a remote load control center 38, for example a public or private utility company, and are communicated in Ethernet format via an internet service provider (ISP) through a wide area broadband network 44, downloaded via a subscriber ISP and modem 46, and output in Ethernet format on a coaxial cable 48 to the command protocol converter 30.

In order to accommodate automatic time-of-day disconnect schedules, a local reference clock 50, for example a Stratum 3 clock module having a free-run accuracy of about 4.6×10 second per month, provides an accurate time reference. A suitable Stratum 3 reference clock 50 can be obtained from Symmetricom, Inc., of San Jose, Calif., preferably a Symmetricom TimeSource 2500 which outputs a Stratum 3 clock signal at 1.544 MHz (4 KHz standard clock is extracted in DS1 format). The clock module 50 includes a modem driver that outputs an RS232 formatted time signal 52 to a programmable On/Off time scheduler 54. The On/Off scheduler 54 is programmed to output time-of-day power turn-off and turn-on signals 56 in RS232 signal format to the command protocol converter 30.

Optionally, the time-of-day disconnect schedule is timed with reference to a highly accurate time reference signal 57 provided by a remotely located primary reference clock 58. Preferably, the primary reference clock is a Stratum 1 clock that has a T1 clock frequency of 4 KHz and a free-run accuracy of at least $10^{-11}$ second per month. A suitable primary reference clock 58 is supplied by the U.S. Global Positioning Satellite (GPS) broadcast frequency national time standard which is disposed in synchronous orbit, with clock reference signals being communicated by radio wave transmission to an on-site receiver module 60. The receiver module 60 includes a modem driver that outputs an RS232 formatted time signal 62 to a programmable On/Off time scheduler 64. The On/Off time scheduler is programmed to output time-of-day power turn-off and turn-on control signals 66 in RS232 signal format to the command signal protocol converter 30.

According to another load control arrangement shown in FIG. 1, turn-on and turn-off signals 67 are transmitted by a hand-held RF transmitter 69 in a wireless digital signal format, for example "KEELOQ," to an on-site receiver module 71. The receiver module 71 includes a modem driver that outputs an RS232 format control signal 73 to the command protocol converter 30. Optionally, the transmitter 69 may be a cell phone with digital messaging capability and the control signals are communicated in a digital signaling format, for example SS-7, via a wide area telecommunications network, for example PSTN, and the receiver 71 may be a telephone message processor coupled via modem to the command protocol converter 30.

According to yet another control signal arrangement shown in FIG. 1, turn-on and turn-off signals 80 are generated by the closure and opening actuation of the dry contacts SW of an on/off switch 75, which may be on-site or remotely located. The logic one and logic zero signals corresponding to switch actuation (SW closed and SW open) are output on low voltage twisted-pair signal conductors directly to the command protocol converter 30, which converts the turn-on and turn-off control signals 80 to PLC X-10 format.

According to still another control signal arrangement, also shown in FIG. 1, turn-on and turn-off command signals 82 in the format of HEX-encoded analog data pulses are applied as serial data command words via a pair of low voltage signal conductors 84 to the input of the command protocol converter 30. FIG. 1 shows the form of the HEX-encoded analog data signal which is a series of DC voltage pulses of variable duration between a high value +V representing a logic "1" and a low value VREF representing a logic "0". The analog voltage levels may transition between V=+5 volts and VREF=0 volt DC, or +V and VREF=−V DC (e.g., +5 and −5 V DC). The HEX-encoded data signals are generated by a control unit 86, which can located on-site or off-site. Preferably, the control unit 86 is constructed as disclosed in U.S. Pat. No. 5,920,156 assigned to Genlyte Thomas Group LLC, and incorporated herein by reference.

A serial data communications interface transfers the HEX-encoded command word HEX-A (e.g., turn-off, turn-on, dim-1, dim-2, etc.) over a serial bus to a serial encoder register in the control unit 86 according to an internal clock signal. Condition codes determine the transmitting rate, and the number of start, stop and parity bits required. In the example herein of HEX-encoded signals, all bits are information bits. The number of start, stop bits and parity bits is zero. A complete analog data command word HEX-A is shifted out of the serial encoder register at the internal clock rate on the serial bus 84 to the input of the command protocol converter 30.

The command signal protocol converter 30 is operable to convert the load reduction commands into PLC data signals

68, formatted according to the power line carrier X-10 data signal protocol. The PLC formatted command signals 68 are input to the command signal transmitter 32 as a serial data stream as shown in FIG. 4. Protocol converters capable of converting various signal formats such as EIA Standard data protocols RS232, RS422, RS423 and RS485, as well as ASCII, HEX, KEELOQ and Ethernet into the X-10 signal format are well known in the art. The conversion function can be implemented by a programmable logic array that is hard-wired or operable under microprocessor control. The conversion function of the command protocol converter 30 can be performed by conventional off-the-shelf computer interface devices manufactured by various companies, for example Model CP290 or Model CM11A supplied by X-10 Pro, Inc. which converts RS232 format command signals into X-10 format command signals.

When a PLC command data signal is transmitted by the remote load controller, a high-frequency burst of PLC control pulses at 120 kHz is transmitted in sync with zero crossover of the filtered AC power waveform over the power distribution conductors. The load reduction command signals are received by all devices that are coupled to that particular power distribution group.

The PLC control data signal burst is input to the signal transmitter 32 (FIG. 1 and FIG. 2). Signal transmission to the addressable control modules of the lighting loads is provided by a high frequency coupling impedance Z, preferably a transformer T1 (FIG. 4) that has a primary winding L1 for receiving filtered AC supply voltage from the blocking filter 34 and a secondary winding L2 coupled to a voltage clamping circuit.

Referring again to FIG. 4, the secondary transformer winding L2 is biased by a 24 volts DC supply voltage and a clamping circuit formed by a Zener diode D1 connected in series with the secondary winding and the +24V DC supply voltage. The clamping circuit provides a fixed voltage drop at a first clamping level across the signal port node K of the coupling impedance Z in response to a logic high value of a command signal, and a second clamping level in response to a logic low value of a command signal. The coupling impedance Z may also be provided by a coupling capacitor.

The PLC-formatted control data command signals are serially input as binary data signals to the gate of a gate-controlled switch (NPN transistor Q) that is connected in parallel across the Zener diode D1. When the PLC data signal is at logic zero, the gate-controlled switch Q is turned OFF, and the Zener diode D1 clamps the secondary winding L2 of the coupling transformer Z at 68 volts DC. However, when the power control data signal 68 rises to logic one value, the base emitter junction of the NPN transistor Q becomes forward-biased, thus turning it ON, and the current output from the command protocol converter 30 drives the transistor switch Q to the ON state in deep saturation, thus pulling the secondary winding L2 of the transformer Z toward reference potential.

This produces a 7.0 volt peak-to-peak binary output signal across the primary transformer winding, thus faithfully repeating the 120 kHz PLC burst command signal (after a delay of one command cycle) at an amplified voltage level. This output command signal is applied directly to the power distribution conductors 12, 14. This effectively boosts the strength of the load control command signals that are applied to the receiver nodes of the dimmer control modules of the lighting load group, thus ensuring positive execution of turn-off and turn-on load commands.

The PLC formatted power command signals 68 output from the PLC transmitter 32 are conducted via output conductors 70, 72; 74, 76 and 77, 79 directly to the hot and neutral power conductors 12, 14 of the phase A, phase B and phase C distribution load groups, on the output (filtered) side of each high frequency blocking filter 34. The power command signals 68 are applied to the dimming modules, turn-on/turn-off modules and dimming ballasts of various lighting loads, including incandescent lamps L, halogen lamps H and fluorescent lamps, as shown in FIG. 2. The existing load groups may also include one or more local master controllers 40, each containing a digital PLC signal receiver and transmitter, accommodating on-site as well as remote control of the lighting loads.

Existing transformer ballasts of fluorescent lighting fixtures are replaced by the electronic dimming ballasts A1, A2, A3, A4, for example electronic ballasts for 2-wire retrofit installation that can be obtained from Advance Transformer Co. of Rosemont, Ill., sold under its brand Mark X® Powerline. The on-site master controller 40 is a programmable lighting controller, preferably a multi-scene dimming and control unit that can be obtained from Genlyte Controls Division of Genlyte Thomas Group LLC of Dallas, Tex. under its brands MultiSet®, Brilliance II®, Compose® PLC and Lytemode®. The dimming modules CM1 and DIM1 are strap and wall box remotely addressable dimmers, for example 600–1500 watt digital preset dimmers with full function 3-way remote capability that can be obtained from Genlyte Controls Division of Genlyte Thomas Group LLC of Dallas, Tex. under its brand Onset®. The non-dimming On/Off control modules CM2 are strap and wall box remotely addressable controllers capable of On/Off operation only, for example Lytemode® brand controllers offered by Genlyte Controls Division of Genlyte Thomas Group LLC of Dallas, Tex.

Various conventional signaling protocols can be used for efficiently and accurately transmitting the PLC power control signals over the power conductors. The preferred embodiment of the invention is described in connection with the X-10 signal protocol that translates bursts of high-frequency signals at 120 kHz into a series of binary information pulses that correspond with a start code, address code and command code.

At a modulation frequency, preferably 120 kHz, that is much greater than the 60 Hz AC power distribution frequency, the transmission of PLC data is synchronized to the positive and negative-going zero-crossing points of the AC supply voltage waveform. Each transmission includes a start code (always set at 1110), a load or building code, and an operation or key code. The building code is composed of four bits representing the letters A through P. The key code is composed of five bits and either corresponds to either a number from one (1) to sixteen (16) or a particular operational command, such as ON, OFF, BRIGHT and DIM. The X-10 protocol supports up to 256 address codes as there are sixteen (16) letters and sixteen (16) numbers available as an address designation for an addressable device connected to the system. These 256 addresses are represented by A1–A16, B1–B16, . . . , P1–P16.

To ensure data integrity, both the building codes and key codes of the X10 protocol are actually transmitted in true and complement form on alternate half cycles of the power line. For example, if the letter B is represented by the building code 1110, the pattern 10101001 is actually transmitted as the building code. Thus, transmission of the four (4) bit start code, the four (4) bit building code, and the five (5) bit key code takes a total twenty-two (22) cycles.

The data signals are transmitted in a series of paired command transmissions using the X-10 protocol generally in serial form:

[address][address] . . . [function][function]
where " . . . " represents a pause or delay between each pair of command transmissions of at least three power line cycles in duration, "address" represents an address of a particular receiver and "function" represents the operation to be performed at the transmitted address. The address and function commands are each composed of a start code, a building code and a key code as described above and are repeated to ensure proper data integrity in the transmission. Moreover, several sets of address commands may be transmitted in succession such that the function command transmitted is applied to the preceding addresses transmitted. Thus, for example, to instruct control modules identified as A1 and A2 to be turned off, the following data pattern commands are transmitted:

[A1][A1] . . . [A2][A2] . . . [Aoff][Aoff]

Upon receipt of this command by the receivers connected to control modules A1 and A2, power to the devices is disconnected by the receiver. Commands other than [Aoff], such as [Aon] or [Dim] (to dim lights) may also be used.

In summary, a remotely accessible power controller has been described for automatically disconnecting building lighting loads to comply with energy consumption codes applicable to the automatic shutoff of electrical lighting, and for automatically disconnecting or dimming building lighting loads to limit total connected power consumption below an agreed level in accordance with load curtailment agreements with public or private utility companies. The remotely accessible power controller uses power line carrier (PLC) signaling over existing AC power distribution conductors for automatically disconnecting or reducing building lighting loads. The power controller is connected by minimum amount of retrofit wiring into an existing end-user alternating current power distribution network, for example, a business power distribution network having AC power conductors that service multiple lighting loads interconnected in one or more power phase groups. Load disconnect commands and load reduction (dimming) commands are transmitted on the AC power conductors in power line carrier format to addressable PLC control modules connected to the dimming and non-dimming lighting loads of each phase group.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

We claim:

1. Power control apparatus for executing load control command signals in an AC power distribution network of the type including power distribution conductors for supplying AC operating voltage at a power distribution frequency to one or more loads, comprising in combination:
    a high frequency blocking filter including a power input circuit for receiving AC operating voltage from an AC power source and a power output circuit for supplying filtered AC operating voltage to the power distribution conductors while suppressing or substantially attenuating the transmission of high frequency signals that occur at a frequency higher than the power distribution frequency;
    a transmitter having an input for receiving load control command signals and an output coupled to one or more of the power distribution conductors on the output circuit side of the high frequency blocking filter for modulating the filtered AC operating voltage with load control command signals at a power line carrier modulation frequency; and
    a control module coupled to one or more of the loads and to one or more of the power distribution conductors for recovering the load control command signals from the modulated AC operating voltage and using the command signals to control the application of the filtered AC operating voltage to one or more of the loads.

2. The power control apparatus for executing load control command signals in an AC power distribution network as set forth in claim 1, said transmitter comprising a signal repeater circuit for repeating the load control command signals at an amplified voltage level on the power distribution conductors.

3. The power control apparatus for executing load control command signals in an AC power distribution network as set forth in claim 1, wherein the high frequency blocking filter comprises:
    a low-pass filter circuit that passes low frequency signals from DC up through the power distribution frequency of the AC supply voltage to a cutoff frequency, and suppresses or substantially attenuates signals above the cutoff frequency, including power line carrier modulation frequencies in the kilohertz region.

4. The power control apparatus for executing load control command signals in an AC power distribution network as set forth in claim 1, wherein the high frequency blocking filter comprises:
    a low pass filter circuit characterized by a relatively low attenuation signal transfer function from DC through the AC power distribution frequency up to a cut-off frequency below the power line carrier modulation frequency, and characterized by a relatively high attenuation signal transfer function that suppresses or substantially attenuates signals occurring at a frequency greater than the cut-off frequency.

5. The power control apparatus for executing load control command signals in an AC power distribution network as set forth in claim 1, wherein the transmitter comprises:
    a signal coupling circuit having an input for receiving AC supply voltage from an AC power source and an output for delivering AC supply voltage to a power distribution conductor;
    a gate-actuated switch coupled to the output of the signal coupling circuit, the switch having switched and un-switched terminals for connecting bias clamping voltage to and removing bias clamping voltage from the output of the signal coupling circuit, and having a gate terminal for turning the switch ON and OFF in response to binary logic data signals;
    a clamping circuit coupled to the output of the signal coupling circuit for clamping the coupling circuit output at a first voltage level when the gate-actuated switch is in the OFF condition, and clamping the coupling circuit output at a second voltage level when the gate-actuated switch is in the ON condition; and
    a gate circuit having an input for receiving binary logic data signals, and an output coupled to the gate terminal of the gate-actuated switch, wherein the gate-actuated switch is gated ON and OFF in response to the binary logic data signals.

6. Power control apparatus for executing load control command signals in an AC power distribution network of the type including power distribution conductors for supplying AC operating voltage to one or more loads, comprising in combination:

an on/off scheduler having an output for conducting load turn-off and load turn-on command signals according to a time-of-day schedule;

a command protocol converter having an input coupled to the on/off scheduler for receiving the load turn-off and load turn-on command signals and having an output for conducting load disconnect and load connect command signals in a power line carrier (PLC) signal format;

a high frequency blocking filter including a power input circuit for receiving AC operating voltage from an AC power source and a power output circuit for supplying filtered AC operating voltage to the power distribution conductors while suppressing or substantially attenuating the transmission of high frequency signals that occur at a frequency higher than the power distribution frequency;

a transmitter having an input for receiving the load control command signals and an output coupled to the power distribution conductors on the output side of the high frequency blocking filter for modulating the filtered AC operating voltage with the load control command signals at a power line carrier modulation frequency; and a control module coupled to one or more of the loads and to one or more of the power distribution conductors for recovering the load control command signals from the modulated AC operating voltage and using the command signals to control the application of the filtered AC operating voltage to one or more of the loads.

7. The power control apparatus for executing load control command signals in an AC power distribution network as set forth in claim 6, wherein the high frequency blocking filter comprises:

a low-pass filter circuit that passes low frequency signals from DC up through the power distribution frequency of the AC supply voltage to a cutoff frequency, and suppresses or substantially attenuates signals above the cutoff frequency, including power line carrier modulation frequencies in the kilohertz region.

8. The power control apparatus for executing load control command signals in an AC power distribution network as set forth in claim 6, wherein the high frequency blocking filter comprises:

a low pass filter circuit characterized by a relatively low attenuation signal transfer function from DC through the AC power distribution frequency up to a cut-off frequency below the power line carrier modulation frequency, and characterized by a relatively high attenuation signal transfer function that suppresses or substantially attenuates signals occurring at a frequency greater than the cut-off frequency.

9. The power control apparatus for executing load control command signals in an AC power distribution network as set forth in claim 6, including a reference clock module coupled to the on/off scheduler for providing a time reference signal.

10. The power control apparatus for executing load control command signals in an AC power distribution network as set forth in claim 9, wherein the reference clock module includes a modem driver that outputs a time reference signal in an EIA Standard data protocol to the on/off time scheduler.

11. The power control apparatus for executing load control command signals in an AC power distribution network as set forth in claim 10, wherein the EIA Standard data protocol comprises a signal data protocol selected from the group consisting of RS232, RS422, RS423 and RS485 and ASCII formats.

12. The power control apparatus for executing load control command signals in an AC power distribution network as set forth in claim 9, wherein the reference clock module comprises a Stratum 3 clock having a free-run accuracy of about $4.6 \times 10^{-6}$ second per month.

13. The power control apparatus for executing load control command signals in an AC power distribution network as set forth in claim 9, wherein the reference clock module comprises a global positioning satellite (GPS) reference clock and a radio receiver module, and the time reference signal is communicated by broadcast radio wave transmission to the radio receiver.

14. The power control apparatus for executing load control command signals in an AC power distribution network as set forth in claim 13, wherein the radio receiver module comprises a modem driver that outputs a time reference signal in an EIA Standard data protocol to the on/off time scheduler.

15. The power control apparatus for executing load control command signals in an AC power distribution network as set forth in claim 14, wherein the EIA Standard data protocol comprises a signal data protocol selected from the group consisting of RS232, RS422, RS423 and RS485 and ASCII formats.

16. The power control apparatus for executing load control command signals in an AC power distribution network as set forth in claim 9, wherein the reference clock module comprises a Stratum 1 clock that has a free-run accuracy of about $1 \times 10^{-11}$ second per month.

17. Power control apparatus for executing load control command signals in an AC power distribution network of the type including power distribution conductors for supplying AC operating voltage at a power distribution frequency to one or more loads, comprising in combination:

a load control center for generating load control command signals;

a command protocol converter having an input coupled to the load control center for receiving the load turn-off and load turn-on command signals and having an output for conducting load disconnect and load connect command signals in a power line carrier (PLC) signal format;

a high frequency blocking filter including a power input circuit for receiving AC operating voltage from an AC power source and a power output circuit for supplying filtered AC operating voltage to the power distribution conductors while suppressing or substantially attenuating the transmission of high frequency signals that occur at a frequency higher than the power distribution frequency;

a transmitter having an input for receiving the load control command signals and an output coupled to the power distribution conductors on the output side of the high frequency blocking filter for modulating the filtered AC operating voltage with the load control command signals at a power line carrier modulation frequency; and a control module coupled to one or more of the loads and to one or more of the power distribution conductors for recovering the load control command signals from the modulated AC operating voltage and using the command signals to control the application of the filtered AC operating voltage to one or more of the loads.

18. The power control apparatus for executing load control command signals in an AC power distribution network as set forth in claim 17, wherein the high frequency blocking filter comprises:

a low-pass filter circuit that passes low frequency signals from DC up through the power distribution frequency of the AC supply voltage to a cutoff frequency, and suppresses or substantially attenuates signals above the cutoff frequency, including power line carrier modulation frequencies in the kilohertz region.

19. The power control apparatus for executing load control command signals in an AC power distribution network as set forth in claim 17, wherein the high frequency blocking filter comprises:
  a low pass filter circuit characterized by a relatively low attenuation signal transfer function from DC through the AC power distribution frequency up to a cut-off frequency below the power line carrier modulation frequency, and characterized by a relatively high attenuation signal transfer function that suppresses or substantially attenuates signals occurring at a frequency greater than the cut-off frequency.

20. The power control apparatus for executing load control command signals in an AC power distribution network as set forth in claim 17, wherein the load control command center comprises an on-site computer for outputting load control command signals in an EIA Standard signal data format to the command protocol converter.

21. The power control apparatus for executing load control command signals in an AC power distribution network as set forth in claim 17, wherein the EIA Standard data protocol comprises a signal data protocol selected from the group consisting of RS232, RS422, RS423 and RS485 and ASCII formats.

22. The power control apparatus for executing load control command signals in an AC power distribution network as set forth in claim 17, wherein the load control command center comprises a remote computer for outputting load control command signals in Ethernet signal format, and the Ethernet formatted command signals are communicated to the command protocol converter via one or more modems coupled to a wide area telecommunications network.

23. The power control apparatus for executing load control command signals in an AC power distribution network as set forth in claim 17, further comprising a radio frequency receiver module coupled to the command protocol converter, and wherein the load control command center comprises a radio frequency transmitter capable of transmitting load control command signals in a wireless signal protocol to the receiver module.

24. The power control apparatus for executing load control command signals in an AC power distribution network as set forth in claim 23, wherein the radio frequency transmitter is a hand-held RF transmitter.

25. The power control apparatus for executing load control command signals in an AC power distribution network as set forth in claim 23, wherein the wireless signal protocol is implemented in KEELOQ format.

26. The power control apparatus for executing load control command signals in an AC power distribution network as set forth in claim 23, wherein the radio frequency transmitter is a cell phone with digital messaging capability and the load control signals are communicated in a digital wireless signaling format, and the receiver module comprises a telephone message processor and a modem coupled to the command protocol converter.

27. The power control apparatus for executing load control command signals in an AC power distribution network as set forth in claim 26, wherein the modem comprises a modem driver that outputs the load control signals in an EIA Standard data protocol to the input of the command protocol converter.

28. The power control apparatus for executing load control command signals in an AC power distribution network as set forth in claim 27, wherein the EIA Standard data protocol comprises a signal data protocol selected from the group consisting of RS232, RS422, RS423 and RS485 and ASCII formats.

29. The power control apparatus for executing load control command signals in an AC power distribution network as set forth in claim 17, wherein the load control command center comprises an On/Off switch having switched and un-switched contacts coupled to the input of the command protocol converter by a pair of low voltage signal conductors.

30. The power control apparatus for executing load control command signals in an AC power distribution network as set forth in claim 29, wherein the load control command signals comprise binary logic control signals generated by the turn-on and turn-off actuation of the On/Off switch contacts in a dry contact mode of operation.

31. The power control apparatus for executing load control command signals in an AC power distribution network as set forth in claim 17, wherein the load control command center comprises a pulse data control signal generator coupled to the input of the command protocol converter by a pair of low voltage signal conductors.

32. The power control apparatus for executing load control command signals in an AC power distribution network as set forth in claim 31, wherein the pulse data signal generator is operable to generate a series of DC voltage pulses ranging in amplitude between a first analog voltage value corresponding to a binary logic "1" and a relatively low analog voltage value corresponding to a binary logic "0".

33. A method for executing load control command signals in an AC power distribution network of the type including power distribution conductors for distributing AC supply voltage at a power distribution frequency to one or more loads, comprising the steps:
  filtering the AC voltage that is supplied to the power distribution conductors by suppressing or substantially attenuating the transmission of signals that occur at a frequency higher than the power distribution frequency;
  periodically modulating the AC supply voltage with a burst of control data signals at a power line carrier modulation frequency; and
  recovering the control data signals and using the control data signals to apply filtered AC power to or disconnect filtered AC power from one or more of the loads.

34. The method for executing load control command signals in an AC power distribution network as set forth in claim 33, including the steps:
  suppressing or substantially attenuating the transmission of high frequency signals from the power input circuit to the power output circuit of the blocking filter; and
  suppressing or substantially attenuating the transmission of high frequency signals from the power output circuit to the power input circuit of the blocking filter.

35. The method for executing load control command signals in an AC power distribution network as set forth in claim 33, including the step:
  amplifying the control data signals; and
  modulating the filtered AC supply voltage with the amplified control data signals.

36. The method for executing load control command signals in an AC power distribution network as set forth in claim 33, including the steps:
  generating the control data signals in a time-of-day on/off scheduler.

37. The method for executing load control command signals in an AC power distribution network as set forth in claim 33, wherein the control data signals comprise turn-on and turn-off command signals and including the step of generating the control data signals by a time-of-day on/off scheduler in accordance with an energy consumption code applicable to the automatic shutoff of electrical lighting.

38. The method for executing load control command signals in an AC power distribution network as set forth in claim 33, wherein the control data signals comprise load shedding command signals and including the step of communicating the control data signals from a public or private utility company at a remote load control center in accordance with a load curtailment agreement to limit total connected power consumption below an agreed level.

39. The method for executing load control command signals in an AC power distribution network as set forth in claim 33, wherein the control data signals comprise binary logic control signals, including the step of generating the binary logic control signals by opening and closing actuation of switched and un-switched contacts in a dry contact mode of operation of an On/Off switch.

40. The method for executing load control command signals in an AC power distribution network as set forth in claim 29, wherein the control data signals comprise a series of DC analog voltage pulses ranging in amplitude between a first analog voltage value corresponding to a binary logic "1" and a relatively low analog voltage value corresponding to a binary logic "0", including the step of communicating the voltage pulses as serial data command words via a pair of low voltage signal conductors.

41. The method for executing load control command signals in an AC power distribution network as set forth in claim 40, including the step on encoding the serial data command words in hexadecimal (HEX) format.

42. The method for executing load control command signals in an AC power distribution network as set forth in claim 33, including the step of generating the control data signals in a wireless digital format, and communicating the control data signals from a wireless transmitter to an on-site receiver module.

43. The method for executing load control command signals in an AC power distribution network as set forth in claim 42, wherein the wireless transmitter is a hand-held RF transmitter, including the step of communicating the load control command signals by broadcast transmission to a receiver module.

44. The method for executing load control command signals in an AC power distribution network as set forth in claim 42, wherein the wireless transmitter is a cell phone, including the step of communicating the load control command signals via a wide area telecommunications network to a telephone message processor.

* * * * *

UNITED STATES PATENT AND TRADEMARK OFFICE
CERTIFICATE OF CORRECTION

PATENT NO.      : 6,842,668 B2
DATED           : January 11, 2005
INVENTOR(S)     : Steven R. Carson and Raymond T. Griffin It is certified that error appears in the above-identified patent and that said Letters Patent is hereby corrected as shown below:

Title page,
Item [62], Related U. S. Application Data, insert -- Continuation-in-Part of Application No. 09/947,964, filed on September 6, 2001. --.

Signed and Sealed this

Seventh Day of February, 2006

JON W. DUDAS
*Director of the United States Patent and Trademark Office*